Sept. 6, 1938.  W. L. MORRISON  2,128,957
RADIATOR SHELL
Filed Jan. 7, 1937
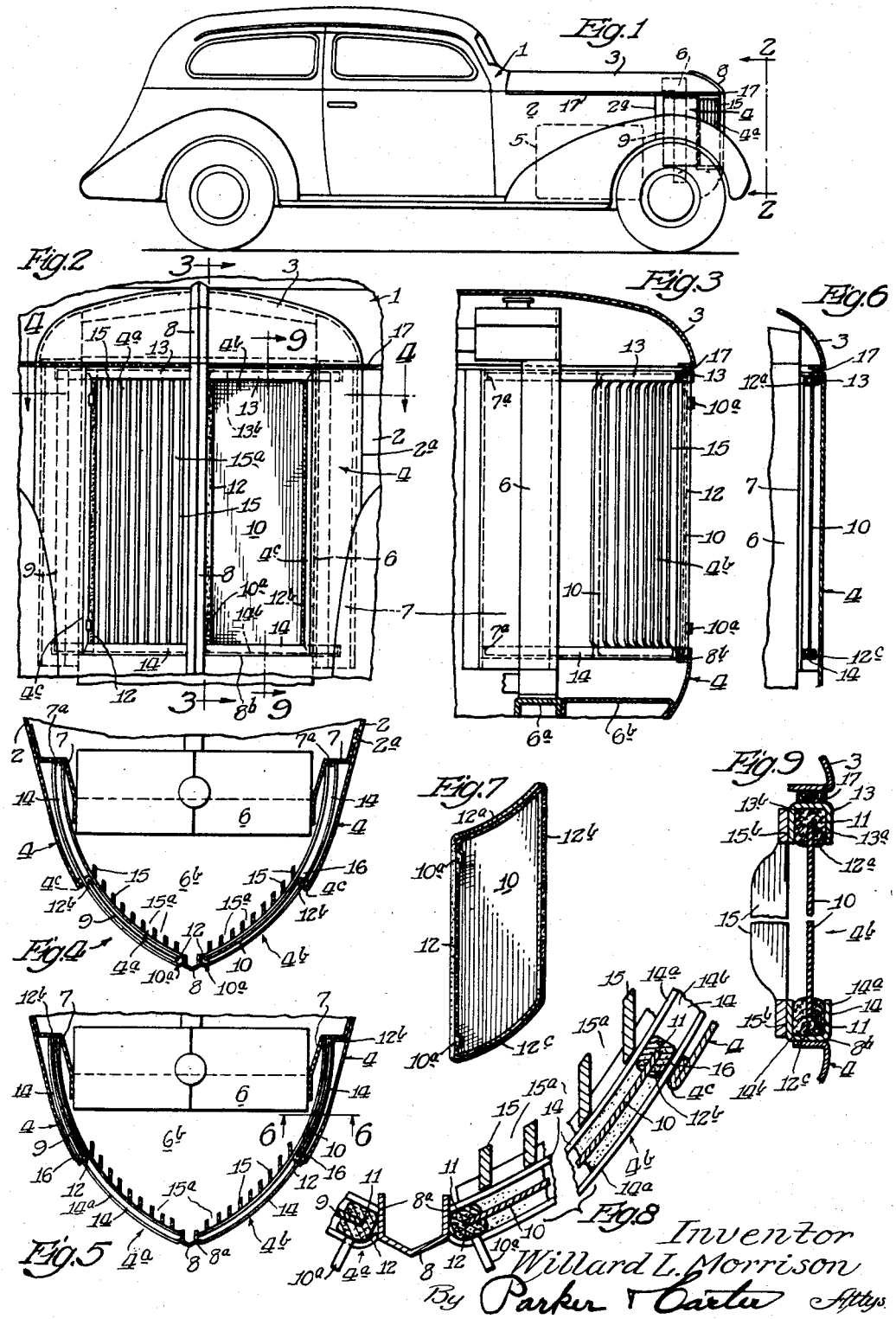
Inventor
Willard L. Morrison
By Parker & Carter Attys Patented Sept. 6, 1938

2,128,957

UNITED STATES PATENT OFFICE 2,128,957

RADIATOR SHELL

Willard L. Morrison, Lake Forest, Ill.

Application January 7, 1937, Serial No. 119,457

4 Claims. (Cl. 180—69)

This invention relates to improvements in radiator shells for automotive vehicles and has for its object to provide a new and improved device of this description. The invention has as a further object to provide a radiator shell construction for the front of an automobile arranged so that the opening in the shell for the entrance of air to the radiator may be adjusted and varied as the conditions require.

It is customary at the present time to provide an air admission opening at the front of the automobile which is large enough to permit the entrance of sufficient air to properly cool the radiator at the highest summer temperatures. This means that for a very great proportion of the time, this opening is far too large. One of the objects of the present invention is to provide a radiator shell so constructed that the opening for the admission of air to the radiator can be adapted to any time of year, the device being preferably provided with indicating means to indicate the position of the parts for the time of year the automobile is being used. The invention has as a further object to provide a streamlined radiator shell with an opening therein and a grille for this opening, with controlling members adapted to be moved out over the outer surface of the grille, to reduce the size of the opening or close it entirely, or adapted to be moved back in under the portion of the shell around the opening, to enlarge the opening or bring it to its maximum size. The invention has other objects which are more particularly pointed out in the accompanying description.

Fig. 1 is a side elevation of an automobile with one form of the invention shown in dotted lines;

Fig. 2 is an enlarged front view of the radiator shell and grille, with parts broken away, having the left hand portion in the open position and the right hand portion in the closed position to the passage of air to the radiator core;

Fig. 3 is a section on the line 3—3 of Fig. 2, with parts broken away;

Fig. 4 is a section on the line 4—4 of Fig. 2, but having the left hand portion of the radiator grille in the closed position and with parts broken away;

Fig. 5 is a view similar to Fig. 4, but with the radiator grille in the open position;

Fig. 6 is a section on the line 6—6 of Fig. 5 and having parts broken away;

Fig. 7 is a perspective view of one of the movable shutters for varying the opening in the radiator grille;

Fig. 8 is an enlarged sectional view of the lower right hand portion of Fig. 4, with parts broken away;

Fig. 9 is an enlarged sectional view taken on the line 9—9 of Fig. 2 and having parts broken away.

Like numerals refer to like parts throughout the several figures.

For purposes of illustration I have shown the invention as applied to an automotive vehicle having a vertical radiator and a vertical radiator shell and grille and with the hood hinged at the windshield, but my invention is not limited to this construction as it may be applied to any type or style of radiator shell and grille.

Referring now to the drawing, I have shown an automobile 1 having side hoods 2, a hinged top hood 3 and a radiator shell and grille generally designated by the numeral 4, to form a housing for the engine 5 and the radiator 6 and to permit and control the passage of air to said radiator. The radiator shell 4 is fastened to the side hoods 2 at 2a and to the radiator 6 by members 7, which prevent the passage of air therebetween. A frame member 6a supports the radiator 6 at the bottom. There is also a plate 6b connected between the lower portion of the radiator 6 and the radiator shell 4, see Fig. 3, to prevent the passage of air therethrough.

The radiator grille 4 is divided into a pair of openings 4a and 4b by the center strip 8, which acts as a stop member for the shutters 9 and 10 when they are in their closed positions, see Figs. 2, 4 and 8. The shutters 9 and 10 have their edges 11 covered by a flexible material 12, 12a, 12b and 12c. I prefer to use cloth covered rubber, although any suitable material may be used.

As the construction of the radiator shell and grille is substantially the same on either side of the center strip 8, I will describe only one side, the right hand side. A curved channel member 13 frames the upper side of the opening 4b and is shaped to suit the contour of the radiator grille and shell and is fastened at 8a to the center strip 8, and at 8b to the shell 4, and at 7a to the baffle member 7, see Fig. 4. The sides 13a of the said channel form a track 13b for edge 12a of the shutter 10 to slide therein. Framing the lower side of the opening 4b is a curved channel member 14 similar to channel member 13 and similarly fastened at 8a and 7a and having sides 14a to form a track 14b for the edge 12c of shutter 10 to slide therein. The vertical edge 4c is bent over on the shell 4 to form a smooth finished opening on this side, see Fig. 8.

Grille bars 15, having spaces 15a to admit air to the radiator 6, cover the opening 4b to form a continuous surface from the hoods 2 and 3 to the center strip 8, and are welded or otherwise fastened to the inner legs 13a and 14a of the shutter guide channels 13 and 14 at 15b. A space 16 is provided between the grille bars 15 and the shell 4 for the shutter 10, which is moved manually through this space by the handles 10a, although any suitable heat responsive device could be substituted to automatically move the shutters when desirable. In Figs. 2, 4 and 8 the shutter 10 is shown in its closed position with its edge 12 impinged upon the center strip 8 and its edge 12b closing the opening 16, to prevent the entrance of air. In Fig. 5 the shutters are shown in their open position with the edge 12 of the shutter 10 closing the space 16 to prevent access to the interior therethrough.

As clearly illustrated in the drawing, particularly Figs. 4 and 5, the shutter 10 is shaped to and moves on the path of an arc passing from the interior of the radiator shell 4 to the exterior of the grille bars 15, to adjustably regulate the air admitted through the openings 15a to the radiator 6. As the grille bars 15 and shutters 10 are similarly shaped and form a part of the radiator shell contour, the outer appearance is pleasing when the grille is either open or closed. Flexible edges 12a and 12c of the shutter 10 grip the channel members 13 and 14 sufficiently to prevent undesirable movement.

Since the shutter 10 moves into and between the radiator 6 and shell 4 when in the fully open position, it is not necessary to lengthen the radiator grille, shell, or both, or change the exterior appearance of the shell when the shutter 10 is moved.

The top hood 3 closes on the flexible material 17 which is fastened to the upper edge of the hood 2 and continues to the front of the grille, where it is fastened on the upper web of the channel member 13, which also acts as the guide for the shutter 10.

I claim:
1. A radiator shell comprising a streamlined portion projecting forwardly of the radiator and having an opening therein, a grille in said opening, a plurality of controlling members adapted to be moved varying distances across said grille, outside thereof, and receiving spaces on the inside of said shell for the said members, into which they may be moved.

2. A radiator shell comprising a streamlined portion projecting forwardly of the radiator and having an opening therein, a grille in said opening, controlling members adapted to be moved varying distances across said grille, receptacles at the rear of said grille, into which said controlling members are received, said receptacles having portions which are opposite said radiator.

3. A radiator shell comprising a streamlined portion projecting forwardly of the radiator and having an opening therein, a grille in said opening, a movable controlling device adapted to be moved varying distances across said grille to control the amount of air passing therethrough, and a receptacle into which the rear portion of said device is received when the device is moved to fully open said opening.

4. A radiator shell comprising a streamlined portion projecting forwardly of the radiator and having an opening therein, a grille in said opening, a controlling member for controlling the size of said opening and a guide for said controlling member on the interior of the said streamlined portion and having a part located between the radiator and the streamlined portion.

WILLARD L. MORRISON.